United States Patent [19]
Knight et al.

[11] 3,820,603

[45] June 28, 1974

[54] ALTERING RELATIVE PERMEABILITY IN PRODUCTION WELLS

[75] Inventors: Bruce L. Knight, John S. Rhudy, both of Littleton, James H. Fullenwider, Aurora, all of Colo.

[73] Assignee: ICI America Inc., Wilmington, Del.

[22] Filed: Nov. 6, 1972

[21] Appl. No.: 303,744

[52] U.S. Cl. .............................. 166/295, 166/305 R
[51] Int. Cl. ............................................ E21b 43/22
[58] Field of Search ................ 166/295, 305 R, 294

[56] References Cited
UNITED STATES PATENTS

| | | | |
|---|---|---|---|
| 3,302,717 | 2/1967 | West et al. ........................... | 166/295 |
| 3,308,885 | 3/1967 | Sandiford ........................... | 166/295 |
| 3,336,979 | 8/1967 | Ingraham ........................ | 166/294 X |
| 3,493,529 | 2/1970 | Krottinger et al. ............ | 166/295 X |

*Primary Examiner*—Ernest R. Purser
*Attorney, Agent, or Firm*—Joseph C. Herring; Richard C. Willson, Jr.; Jack L. Hummel

[57] ABSTRACT

The water-to-hydrocarbon ratio of a production well is decreased by injecting into the reservoir in the immediate vicinity of the production bore hole an aqueous solution containing a water-soluble polymer obtained as a product of radiation-induced polymerization of acrylamide and/or methacrylamide and acrylic acid, methacrylic acid, and/or alkali metal salts thereof. The polymerization is preferably carried out in 10–60 percent aqueous monomer solution with gamma radiation. The mixture of monomers, before radiation, preferably contains 20–99 percent acrylamide and 80–1 percent sodium acrylate.

19 Claims, No Drawings

3,820,603

ALTERING RELATIVE PERMEABILITY IN PRODUCTION WELLS

BACKGROUND OF THE INVENTION

Field of the Invention

This invention relates to injecting an aqueous polymer solution into a subterranean reservoir in fluid communication with a production well to decrease the water-to-hydrocarbon ratio being produced through the production well. The polymer is obtained by radiation-induced polymerization.

Description of the Prior Art

Production of excessively large amounts of water in production wells has hindered the oil industry for many years. To overcome this adversity, methods have been devised to try and plug-off the water-producing section of the production formation, for example with cement, plastic or other similar materials. Also, solutions having the property to solubilize the water within the formation have been injected into the production sands immediately adjacent the production well to solubilize and thus remove the water; however, this is merely a temporary solution to the problem. Where vertical permeability has caused water to flow into a production stratum, the prior art has used a "pancake" type of sealing material such as cement to segregate the two different stratum to prevent vertical permeation of the water into the oil production zone. Also, the entire production stratum has been cemented off and thereafter perforated in the oil producing portion thereof. The above methods have generally met without commercial success, based in part upon the expense and also because it is difficult to predict what portion of the reservoir should be made impermeable to the flow of water, etc.

In addition, the production zone has been treated with high molecular weight amines to make the reservoir rock more oleophilic and thus less permeable to the flow of water. U.S. Pat. No. 2,908,641 to Boyle teaches the use of relatively low molecular weight aliphatic amines for treating the formations to improve the flow of oil through the production well without increasing the flow of water.

U.S. Pat. No. 3,572,416 to Kinney et al uses micellar dispersions to solubilize water within the immediate vicinity of the production well.

U.S. Pat. No. 2,331,594 to Blair, Jr. imparts oil wettability to the reservoir rock in the immediate vicinity of a production well by injecting high molecular weight amines and substituted ammonium compounds.

U.S. Pat. No. 3,087,543 to Arendt shuts off water production in a producing well by "preferentially shutting off the watered-out portion of the producing interval." Such is accomplished by treating the entire production interval with an acrylamide-carboxylic acid copolymer; the large molecules of the copolymer tend to plug the rock pores of the formation by adsorbing onto the rock and thus reducing the permeability. The patent teaches that when oil is produced, the formation is restored to its original permeability whereas the water has much less effect in restoring permeability. Arendt teaches that the percentage of the reservoir that is oil productive is restored essentially to its original capacity within a short time by the flow of oil therethrough. Examples of Arendt's copolymers are those which are "commercially available" and which are chemically catalyzed polymerization reaction products.

Sandiford et al in "Injection of Polymer Solutions in Production Wells," American Institute of Chemical Engineers, 71st National Meeting, February, 1972, teaches that partially hydrolyzed polyacrylamides injected in production wells will reduce water production. They teach that the more hydrolyzed polyacrylamides give the highest efficiency.

The production wells that experience the most problem with high water to oil ratios are classified as "stripper" production wells. These wells are generally abandoned because of the high cost associated with producing the large volumes of water and only small volumes of oil. However, if the large production of water was not associated with the oil production, then these "stripper" wells would still be economically feasible. That is, lifting and disposing of the large volumes of water is costly and adds to the expense of producing crude oil. Waterflooded fields are a good example of where "stripper" wells are encountered. Where the wells within the waterflooded reservoirs are characterized by substantially directional permeability, they may be experiencing extremely high water/oil ratios for some wells and only modest water/oil ratios for other wells. In these instances, this particular invention is particularly useful to reduce the water/oil ratios while maintaining or possibly increasing the oil production therefrom.

SUMMARY OF THE INVENTION

Applicants have discovered that by treating the production wells with a polymer obtained by radiation polymerization, the "WHR" (water-to-hydrocarbon ratio, hydrocarbon is meant to include crude oil, lower molecular weight hydrocarbons such as natural gas, hydrocarbon containing mixtures, e.g., black trona brine and any hydrocarbon produced from a subsurface reservoir) can be reduced. Applicants postulate that the beneficial effect of their polymer is due, in part, to the polymer's ultrahigh molecular weight and very narrow molecular weight distribution and a very narrow anionic charge distribution, the overall effect being to obtain high permeability reductions which reduce relative permeability of the treated rock to the flow of water while only slightly influencing the relative permeability to the flow of hydrocarbon. The radiation prepared polymers are obtained by radiating an aqueous solution containing preferably 10–60 percent by weight of monomer which is acrylamide and/or methacrylamide and acrylic acid, methacrylic acid and/or alkali metal salts thereof. A preferred mixture of the monomer is 20–99 percent acrylamide and 80–1 percent by weight, based on the total weight of monomer, of sodium acrylate. Radiation intensity is 250–1,000,000 rads/hr., and the dosage is 500–300,000 rads. The reaction product may be diluted with water and used directly, or the polymer can be extracted from the reaction product, dried, and thereafter solubilized. Reduced WHR's are obtained when compared with equivalent molecular weight polymers or copolymers.

PREFERRED EMBODIMENTS OF INVENTION

The monomer is a combination of at least one compound selected from the group consisting of acrylamide and methacrylamide and at least one compound selected from the group consisting of acrylic acid, methacrylic acid, alkali metal acrylate, and alkali metal methacrylate. Minor amounts of additional ethylenically unsaturated, copolymerizable monomers may also be used. Preferably, the monomer is a mixture of acrylamide and sodium acrylate. It is preferred that the monomer contain about 1–80 percent and preferably 20–75 percent and more preferably 25–60 percent of acrylic acid or alkali metal salt thereof, e.g., sodium acrylate.

Irradiation of the monomer is preferably carried out in an aqueous solution containing about 10 percent to about 60 percent and more preferably about 15 percent to about 45 percent by weight of dissolved monomer. At the lower concentrations of monomer, the product is generally a pourable polymer solution and at concentrations above about 15 percent by weight, the product is generally a nonpourable gel. A water-insoluble product may result at concentrations above about 60 percent monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are kept constant.

The aqueous monomer solution preferably contains not more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. The useful radiation has a wavelength below 3,500 A. and preferably below 2,000 A. The radiation employed may be particulate or electromagnetic in nature. Examples include accelerated electrons, protons, neutrons, etc., as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the copolymer. That is, under otherwise identical conditions, low intensities generally give higher molecular weights.

The radiation dose is preferably at least about 1,000 rads and more preferably at least about 1,500 rads. The maximum dose level is preferably not more than 100,000 rads and more preferably not more than 50,000 rads.

The radiation dose used directly influences the intrinsic viscosity and degree of monomer-to-polymer conversion. At a given radiation intensity and monomer concentration, an increase in radiation dose generally tends to result in a decrease in the intrinsic viscosity of the polymer produced and an increase in the degree of monomer-to-polymer conversion. The radiation dose may be also influence the water-solubility of the polymer as it has been found that too high radiation doses may render the resulting polymer water-insoluble. At the preferred dosage rates, conversion up to about 100 percent and preferably 80–100 percent of the monomer to polymer may be obtained without undue insolubilization.

The pH of the aqueous monomer solution is generally not critical except very low pH values may cause insoluble products to form. Preferably the pH is within the range of 3–13 and more preferably about 8 to about 11. Although higher and lower pH values may be used, it should be recognized that hydrolysis tends to occur at pH values much below about 3 and much above about 11.

While the process described above may be used to prepare polymers having an intrinsic viscosity from about 6 to about 30 dl/g (deciliters per gram) in 2 normal sodium chloride at 25.5° C., the process is modified somewhat to prepare polymers having an intrinsic viscosity below about 6 dl/g or above about 30 dl/g in 2 normal sodium chloride at 25.5° C. Polymers having an intrinsic viscosity below about 6 dl/g are prepared by carrying out the polymerization reaction described above in the presence of a chain transfer agent. The chain transfer agent tends to restrict the growth of active polymer chains and thereby results in the formation of polymers having lower molecular weight (intrinsic viscosity). The chain transfer agents which may be used herein may be any chain transfer agent which tends to restrict the growth of the polymer chains and thereby aid the formation of lower molecular weight (lower intrinsic viscosity) polymers, which is soluble in the reaction medium, and which does not interfere with the polymerization by reacting with the monomer. Illustrative examples of chain transfer agents which may be used include lower alkyl alcohols, such as methanol, ethanol, and isopropanol; halogenated compounds, such as trichloroacetic acid; thiosorbitols containing two thio groups and four secondary hydroxyl groups; and mercaptans. The amount of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of chain transfer agents.

In order to prepare polymers having an intrinsic viscosity above about 30 dl/g, the polymerization reaction is terminated when less than about 75 percent and preferably when less than about 60 percent by weight of the monomer has been converted to polymer. It has been found that the intrinsic viscosity of the resulting polymer tends to decrease as the percent of conversion of monomer to polymer increases. For reasons of economy, it is not practical to tolerate conversions lower than about 20 percent.

More specifically, to prepare polymers having intrinsic viscosities from 30 to about 60 dl/g, it is preferred that the radiation intensity be below about 100,000 and more preferably below about 50,000 rads/hr and the monomer concentration of the aqueous solution to be irradiated be about 20 to about 60 percent and preferably 25 to about 50 percent and that the conversion of the monomer to the polymer be about 15 to about 75 percent, and more preferably less than 50 percent.

Where it is desired that the polymers have the highest molecular weight and the lowest Huggins constant, the reaction conditions should be such that the dosage and conversion be low, the monomer concentration be relatively high, and the radiation intensity be relatively low--these preferred parameters being within the range of reaction conditions taught herein.

Where it is desired to obtain a less water-soluble polymer, the polymer can be branched or partially cross-linked. Such can be accomplished by overradiating, e.g., by continuing the radiation after all the monomer has been converted to polymer, or continuing the radiation after insoluble polymer begins to appear. Also, partial cross-linking can be effected using ethylenically unsaturated water-soluble copolymerizable monomers containing more than one ethylenically unsaturated bond. Examples of such monomers include methylene bisacrylamide, polyacrylates like sorbitol polyacrylate and polyallyl ethers of sorbitol like hexallyl sorbitol and like monomers. Where these monomers are used in the radiation polymerization process, they are preferably present in concentrations of about 0.01 to about 10 percent and preferably 0.05 to about 5 percent and more preferably 0.1 to about 3 percent, by weight.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60 percent by weight, provided the radiation dose used is sufficiently low to result in the formation of water-soluble polymers, the use of a monomer concentration of 60 percent by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1 may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the reaction conditions employed in Example F, Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a nonpourable, rubbery gel, depending upon the polymer concentration and intrinsic viscosity of the polymer. Polymer solutions produced by the radiation may be admixed with water and used directly or the polymer solution may be concentrated by conventional means or it may be recovered in particulate form, i.e., dry form. For example, a nonpourable gel may be finely subdivided and the water removed from the subdivided gel with a water-miscible, volatile organic liquid, e.g. methanol, which has no affinity for the copolymer.

The polymer may contain cations which are preferably monovalent cations and more preferably sodium.

The polymers obtained from this radiation polymerization have relatively low Huggins constants. This constant is related to the linearity of the polymer where molecular weights are constant, i.e., for two copolymers having similar molecular weights, but different Huggins constant, the lower Huggins constant indicates a more linear polymer. Polymers having Huggins constants below 1 and preferably below 0.7 and more preferably below 0.5 are preferred with this invention. A more detailed definition of Huggins constant and method for determining Huggins constant of a polymer is found in "Textbook of Polymer Chemistry," Billmeyer, Interscience Publishers, N.Y., 1957, pp. 128–139.

Intrinsic viscosity of the polymer can vary from less than about 1 to about 60 dl/g and preferably is about 5 to about 35 dl/g. The premeability of the reservoir rock to be treated will greatly influence the desired intrinsic viscosity, but, generally speaking, a lower permeability reservoir rock requires lower intrinsic viscosities. For example, permeabilities less than about 50 md will generally demand intrinsic viscosities less than about 10, whereas premeabilities of about 100–200 md demand intrinsic viscosities of about 10–20 and permeabilities greater than 200 md demand intrinsic viscosities greater than about 20 for improved results. The intrinsic viscosity numbers referred to are measured in a 2 normal sodium chloride solution at 25.5° C. It can generally be concluded that the effectiveness of the polymer increases as the intrinsic viscosity increases, providing the degree of branching does not substantially increase. Mixtures of polymers having different intrinsic viscosities may be used, especially in a heterogeneous formation. Where the reservoir is characterized by a very high permeability, i.e., permeabilities in excess of 1 darcy, the intrinsic viscosity is desirably greater than 25 dl/g.

The polymer may be solubilized and diluted to the desired concentration with water. The use of water containing large amounts of polyvalent metal ions which have an adverse effect on the viscosity of the polymer solution or on the water solubility of the polymer is preferably avoided. The amount of polyvalent metal ions which may be present in the aqueous polymer solution is dependent upon the specific polyvalent metal ion present, the temperature and pH of the solution, and the intrinsic viscosity and anionic content of the polymer. In general, the polymer becomes less tolerant of polyvalent metal ions as the intrinsic viscosity, anionic content, and concentration of the polymer increases. The use of water containing substantial amounts of copper ions and/or iron ions is preferably avoided due to the adverse effect such ions may have on the water-solubility of the polymer, etc. where maximum viscosity is desired for a given polymer concentration, the water preferably contains less than about 500 ppm of TDS (total dissolved solids). Also, where maximum viscosities are desired, the water preferably contains less than about 50 ppm of divalent cations, such as calcium and/or magnesium, i.e., the water is classified as "soft" water. Shearing of the polymer upon dissolution and injection into the reservoir should be avoided if maximum viscosity is desired. To obtain maximum viscosity with the gel form of the polymer, the gel is first extruded and then cut into fine pieces, e.g., the size of BB's, and thereafter agitated in aqueous solution at low shear rates. Pumps characterized by low shear rates as well as agitators operated at low shear rates are especially useful. Water-soluble alkaline salts, that is salts which give pH above 7 in water, such as alkali metal carbonates, may be added to the aqueous solution to facilitate solubilization of the polymer. A preferred alkaline slat is sodium carbonate. The amount of alkaline salts added to the water must be carefully controlled if one desires to avoid hydrolysis of the polymer. Other additives known to the art are also useful.

One of the unique features of this polymer manufacturing process is the capability of producing a material of ultra-high molecular weight and very narrow molecular weight distribution and very narrow anionic charge distribution. These properties effect high permeability reductions in the reservoir rock which reduce the relative permeability to the flow of water while only slightly influencing the relative permeability to the flow of hydrocarbon—in essence, these properties permit a higher percentage of the polymer to be effectively utilized. The exact mechanism of how the polymer attaches itself to the reservoir rock, if at all, is not known. It is postulated that the polymer "plugs" the pore openings of the reservoir rock by adsorption, absorption, or entrapment, etc. Of course, the overall effect is to reduce the permeability of the formation, but yet leave some permeability of the rock; this degree of permeability reduction is referred to herein as "plugging." Once the production well is returned to production, the WHR is reduced by virtue of alteration of the relative permeability to water.

The production well can be treated by injecting into the well about 0.1 to about 1,200 and preferably about 10 to about 1,000 and more preferably about 25 to about 500 barrels of aqueous polymer solution per foot of the formation to be treated. The formation to be treated is preferably that portion of the formation which has characteristically produced high WHR's. However, other portions of the reservoir characteristic of lower WHR's can be treated without adverse effects. The polymer concentration within the aqueous solution can range from about 10 to about 10,000 ppm, preferably about 50 to about 5,000 and more preferably about 100 to about 1,000 ppm. The production well may be shut-in for hours or days after the formation is treated with the aqueous polymer solution. The desired and preferred shut-in period will depend, of course, upon the particular reservoir being treated and other characteristics of the formation. After the formation is treated with the aqueous polymer solution, it is permitted to produce and reduced WHR's are realized. All or a portion of the formation producing the high WHR may be treated. Also, packers, diverting agents (including balls, e.g., in a perforated casing) and other oil field technology may be used to treat the formation, e.g., in a heterogeneous formation.

The aqueous polymer solution can contain additives to impart desired characteristics to the process. For example, oleophilic agents (e.g., high molecular weight amines), salts, surfactants, alcohols, pH control, oxygen scavenging agents, corrosion inhibitors biocides, sequestering agents, viscosity stabilizers, solution stabilizers, and other like agents can be incorporated into the aqueous polymer solution. In general, any component can be added to the aqueous polymer solution as long as the component is compatible with the polymer and will not impart an overriding detrimental influence to the process.

Where it is desired to restore part of the permeability to the flow of water, the treated reservoir may be contacted with agents to chemically degrade the polymer, e.g., aqueous solutions of sodium hypochlorite or hydrazine.

The following examples are presented to teach specific working embodiments of the invention; such are not meant to limit the interpretation of the invention. Unless otherwise specified, all percents are based on volume.

PREPARATION OF THE COPOLYMERS

Polymers used for testing are prepared with Cobalt 60 gamma radiation; radiation intensities and dosages are outlined in Table 1. The process for preparing Polymer A is explained; preparation of the other polymers is similar except for variations indicated in Table 1.

To 24,000 gms of deionized water there are added 692 gms of sodium hydroxide. After cooling the solution to 30° C, 1,250 gms of acrylic acid are added. Thereafter, 5,000 gms of acrylamide are added while mixing, and the pH is adjusted to 9.4. The resulting solution contains 75 percent by weight acrylamide (AAd) and 25 percent by weight sodium acrylate (NaAA) and has a total monomer concentration of 21.4 percent by weight. The solution is purged with $N_2$ for 20 minutes and thereafter sealed. The sample is irradiated with Cobalt 60 gamma radiation at an intensity of 18,000 rads/hr. (R/hr.) to a total dose of 8,800 rads (R). The resulting product is a gel-like mass.

A portion of the gel is weighed, and thereafter extracted with methanol to precipitate the polymer. The polymer is dried in a vacuum oven at 36° C and 0.02 psia for 24 hours and then to constant weight at 110° C. Weight of the dried product divided by the theoretical weight gives a monomer conversion of 93 percent.

A portion of the gel is solubilized in water by first extruding it through a "meat" grinder, the "spaghetti"—like extrusion is cut into "BB" size particles and then dissolved in water by agitating at a low rpm to prevent substantial shearing of the polymer.

The residue of the gel is produced in dry powder form by first extruding the gel, then dissolving it in water and thereafter adding methanol to precipitate the polymer out of the solution. The polymer is then ground to less than 20 mesh size and finally dried at 60° C in a vacuum oven.

The intrinsic viscosity is measured at 25.5° C in 2 normal NaCl. The Huggins constant is measured by the method described in "Textbook of Polymer Chemistry," Billmeyer, Interscience Publishers, New York, 1957, pp. 128–139.

The monomer used in Sample "G" is dissolved in water containing 9.1 percent by weight of methanol.

TABLE 1.—INFORMATION ON POLYMER SAMPLES

| Polymer | AAd/NaAA wt. ratio | Monomer concentration (percent) | pH | Intensity (R/hr.) | Total dose (R) | Additive (percent) | Monomer conversion (percent) | Intrinsic viscosity Gel (dl./g.) | Intrinsic viscosity Powder (dl./g.) | Huggins constants Gel | Huggins constants Powder |
|---|---|---|---|---|---|---|---|---|---|---|---|
| A | 75/25 | 21 | 9.4 | 18,000 | 8,800 | | 93 | 28.7 | 28.0 | | 0.10 |
| B | 70/30 | 21 | 9.4 | 20,000 | 9,800 | | 93 | 22 | 20 | 0.10 | 0.10 |
| C | 60/40 | 22 | 9.4 | 20,000 | 10,800 | | 93 | 28.0 | 28.0 | | |
| D | 70/30 | 30 | 9.5 | 230,000 | 50,000 | | 91 | 14 | 12.8 | | 0.88 |
| E | 70/30 | 40 | 9.5 | 10,000 | 1,760 | | 34 | 39.4 | 33 | 0.06 | |
| F | 70/30 | 24 | 9.5 | 100,000 | 15,000 | | 86 | 18.5 | | 0.24 | |
| G | 70/30 | 27 | 9.5 | 20,000 | 11,500 | MeOH 9.1 | 91 | 12.4 | 11.7 | 0.31 | 0.88 |
| H | 70/30 | 13 | 9.5 | 220,000 | 44,000 | MeOH 15 | 96.5 | 1.0 | | | |
| I | 70/30 | 13 | 9.5 | 220,000 | 44,000 | | 96.5 | 5.8 | | 0.64 | |
| J | 70/30 | 25 | 9.5 | 220,000 | 44,000 | MeOH 15 | 84.0 | 6.9 | | 0.52 | |
| K | 70/30 | 24 | 9.5 | 20,000 | 7,660 | | 86.7 | 28.2 | | 0.13 | |
| L | 70/30 | 30 | 9.5 | 20,000 | 2,667 | | 54 | 31.0 | | 0.04 | |
| M | 90/10 | 40 | 9.6 | 10,000 | 1,850 | | 24 | 53 | | <0.02 | |

EXAMPLE I

Core samples, 1 inch in diameter by 3 inch long, taken from a sandstone formation core are first flushed with toluene, then dried in a vacuum. Permeability of the cores is between 100 and 200 md. The cores are then encapsulated in plastic, except for the ends. The polymers are dissolved in water containing Table 2 indicated ppm of TDS and are then passed through a 200-mesh screen to remove any large particles and are thereafter injected into the core samples. The initial and flushed permeabilities of the rear sections of the core samples are measured with water containing about 500 ppm of TDS. Table 2 shows the results:

1. the core is saturated and flooded with water containing 42,000 ppm of TDS;
2. thereafter the core is flooded with a crude oil having a viscosity of 10.5 cp at 72° F to irreducible water saturation;
3. thereafter the core is flooded to residual oil saturation using the water in (1);
4. then the core is flooded with 9.7 pore volumes of (1) water containing 300 ppm of Polymer "D" (see Table 1);
5. thereafter the core is flushed with 18.8 pore volumes of (1) water and
6. finally the core is flushed with 10.7 pore volumes of the crude oil defined in (2).

In the above sequential flooding, all floods are carried out until stable pressures are achieved except steps 4 and 6. In steps 4 and 6, the pressure continued to decrease during the crude oil injection even after 9–11 pore volumes, thus indicating that the oil relative permeability may have been only slightly, if at all, influenced by the polymer. Permeability data of the above flooding sequence are indicated in Table 3:

TABLE 2.—RESULTS OF POLYMER FLOODING IN 100-200 MD. SANDSTONE CORES

| Run | Polymer | Brookfield viscosity at 6 r.p.m. (cp.) | Initial permeability to water (500 p.p.m. TDS) (md.), rear | Flushed permeability to water after polymer (md.), rear | Permeability reduction, rear |
|---|---|---|---|---|---|
| 1 | A | 26.7 | 142 | 1.7 | 82 |
| 2 | B | 32.2 | 145 | 2.6 | 56 |
| 3 | C | 27.2 | 112 | 1.5 | 78 |
| | Prior art polymers | | | | |
| 4 | Copolymer #1 | 39.2 | 180 | 3.6 | 50.5 |
| 5 | Copolymer #2 | 38.5 | 193 | 11.3 | 17.1 |
| 6 | Partially hydrolyzed polyacrylamide | 20.0 | 154 | 10.2 | 15 |

Runs 1–3 and 6 contain 700 p.p.m. polymer dissolved in water containing about 500 p.p.m. of TDS.
Runs 4–5 contain 800 p.p.m. polymer dissolved in water containing about 500 p.p.m. of TDS.
Copolymer #1=a commercially available, anionic acrylamide copolymer obtained by a chemically catalyzed polymerization reaction; has an intrinsic viscosity of 12.5 and a Huggins constant of 0.34.
Copolymer #2=a commercially available, very high molecular weight, strongly anionic copolymer of acrylamide obtained by a chemically catalyzed polymerization reaction; has an intrinsic viscosity of 22.0 and a Huggins constant of 0.18.
Partially hydrolyzed polyacrylamide=a commercially available, partially hydrolyzed, high molecular weight polyacrylamide obtained by a chemically catalyzed polymerization reaction; has an intrinsic viscosity of 15.1 and a Huggins constant of 0.38.

Runs 1 through 3, as compared to Runs 4–6, exhibit higher permeability reductions—thus, the polymers of this invention as compared to commercially available polymers, effect more plugging. As a result, a lower WHR can be anticipated.

EXAMPLE II

A 1 inch in diameter by 3 inch long sandstone core is first flushed with toluene and then dried in a vacuum. Thereafter, the core is flooded in the following sequence:

TABLE 3.—PERMEABILITY DATA

| Permeability to— | Obtained from flooding step No.— | $k$, md. | $k_r$ |
|---|---|---|---|
| Water (initial perm.) | 1 | 218 | |
| Oil at Swi | 2 | 140 | 0.643 |
| Water at Sor | 3 | 23.8 | 0.109 |
| Water at Sor (after polymer injection) | 5 | 1.47 | 0.0067 |
| Oil at Swi (after polymer injection) | 6 | 64.3 | 0.295 |

NOTE.—All relative permeabilities, both before and after polymer injection, are based on the absolute permeability of 218 md.

For the case of two-phase flow (oil and water) in a linear system such as in this example, the WHR is expressed as follows:

$$WHR = gw/go = i_{rw}/k_{ro}\mu o/\mu w$$

where $q_w$ and $q_o$ are volumetric flow rates of water and oil, respectively; $k_{rw}$ and $k_{ro}$ are relative permeabilities to the flow of water and oil, respectively; and $\mu_w$ and $\mu_o$ are the water and oil viscosities. Thus, for a specific crude oil and water, WHR is proportional to $k_{rw}/k_{ro}$. The WHR is reduced when $k_{rw}$ is reduced by a large amount compared to any reduction in $k_{ro}$. From Table 3, using end-point values, the reduction in $k_{rw}$ is $0.109/0.0067 = 16.3$-fold, while the reduction in $k_{ro}$ is only $0.643/0.295 = 2.2$-fold; thus, the WHR is reduced by a factor of $16.3/2.2 = 7.4$.

EXAMPLE III

A production well representative of the sandstone core in Example II is treated with the polymer of this invention. Before treatment, the WHR is 50 and after treatment with 300 ppm of polymer D in Table 1, the WHR is 5.4. This indicates a reduction in water production of 95 percent. The oil production before treatment is 2 BPD and after treatment is 0.9 BPD. In this particular case, the drawdown pressure is constant.

In the same well, the drawdown pressure is doubled and the oil production remains constant while the water production is reduced 90 percent.

It is not intended that the invention be limited by the specifics taught above. Rather, all equivalents obvious to those skilled in the art are intended to be incorporated within the scope of the invention, as defined in the specification and appended claims.

What is claimed is:

1. An improved process of treating a production well having a high water-to-hydrocarbon ratio and wherein a polymer is injected into at least a portion of the production interval of the producing well to reduce the produced water-to-hydrocarbon ratio, the improvement comprising injecting into at least a portion of the production interval a polymer obtained as a product of radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentrations of about 10 percent to about 60 percent by weight dissolved monomer in an aqueous medium, the radiation intensity being about 250 to about 1,000,000 rads/hr, and the radiation dose being about 500 rads to about 300,000 rads, the polymer effectively reducing the relative permeability to the flow of water, and thereafter permitting the well to produce.

2. The process of claim 1 wherein one of the monomers is acrylic acid.

3. The process of claim 1 wherein one of the monomers is methacrylic acid.

4. The process of claim 1 wherein one of the monomers is sodium acrylate.

5. The process of claim 1 wherein one of the monomers is sodium methacrylate.

6. The process of claim 1 wherein one of the monomers is acrylamide.

7. The process of claim 1 wherein the polymer is a copolymer obtained by copolymerizing acrylamide and sodium acrylate.

8. The process of claim 1 wherein the radiation intensity is within the range of about 1,000 to about 300,000 rads/hr.

9. The process of claim 1 wherein the radiation dose is within the range of about 1,000 to about 100,000 rads.

10. The process of claim 1 wherein the aqueous medium is at a pH within the range of about 3 to about 13.

11. The process of claim 1 wherein the pH of the aqueous medium is within the range of about 8 to about 11.

12. The process of claim 1 wherein the polymer is water soluble and the production interval is treated with an aqueous polymer solution.

13. A process of reducing the producing water-to-hydrocarbon ratio of at least a portion of a production interval of a production well characteristic of high water-to-hydrocarbon ratios, the process comprising treating at least a portion of the production interval by injecting into the interval an aqueous solution comprised of a water-soluble copolymer obtained by radiation polymerization of an aqueous solution comprised of about 10 percent to about 60 percent by weight of a mixture of about 20 to about 99 percent acrylamide and about 80 percent to about 1 percent sodium acrylate, the radiation intensity being within the range of about 250 to about 1,000,000 rads/hr. and the radiation dose being within the range of about 500 rads to about 300,000 rads, the polymer effectively reducing the relative permeability to the flow of water, and thereafter permitting the production well to produce.

14. The process of claim 13 wherein the copolymer obtained from the radiation polymerization is in the form of a gel.

15. The process of claim 13 wherein the aqueous solution contains 20 percent to about 75 percent by weight of sodium acrylate.

16. The process of claim 13 wherein the radiation is gamma radiation.

17. The process of claim 13 wherein the radiation intensity is within the range of about 5,000 to about 200,000 rads/hr and the radiation dose is within the range of about 1,500 to about 50,000 rads.

18. The process of claim 13 wherein black trona brine is produced through the production well.

19. The process of claim 13 wherein the hydrocarbon is crude oil.

* * * * *

UNITED STATES PATENT OFFICE
CERTIFICATE OF CORRECTION

Patent No. 3,820,603          Dated June 28, 1974

Inventor(s) Bruce L. Knight et al.

It is certified that error appears in the above-identified patent and that said Letters Patent are hereby corrected as shown below:

Column 10, line 68, "WHR=gn/go= $i_{rn}/k_{ro}$uo/uw" should read -- WHR=gn/go=$K_{rn}/K_{ro}$uo/un --.

Signed and sealed this 14th day of January 1975.

(SEAL)
Attest:

McCOY M. GIBSON JR.
Attesting Officer

C. MARSHALL DANN
Commissioner of Patents